United States Patent
Wright et al.

(10) Patent No.: US 11,652,694 B2
(45) Date of Patent: May 16, 2023

(54) EXTENDING A LOCAL AREA NETWORK SECURELY

(71) Applicant: Charter Communications Operating, LLC, St. Louis, MO (US)

(72) Inventors: Ethan Wright, Denver, CO (US); Micah Labbee, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/391,725

(22) Filed: Aug. 2, 2021

(65) Prior Publication Data

US 2023/0030301 A1 Feb. 2, 2023

(51) Int. Cl.
*G06F 15/173* (2006.01)
*H04L 41/12* (2022.01)
*H04L 61/5014* (2022.01)
*H04L 101/668* (2022.01)

(52) U.S. Cl.
CPC .......... *H04L 41/12* (2013.01); *H04L 61/5014* (2022.05); *H04L 2101/668* (2022.05)

(58) Field of Classification Search
CPC .. H04L 41/12; H04L 61/2015; H04L 61/6068
USPC ................................. 709/223, 224, 225, 227
See application file for complete search history.

(56) References Cited

U.S. PATENT DOCUMENTS

| | | | | |
|---|---|---|---|---|
| 5,748,625 A * | 5/1998 | Hashimoto | ........ | H04Q 11/0471 370/467 |
| 5,751,954 A * | 5/1998 | Saito | ................... | H04L 12/4625 709/245 |
| 6,591,306 B1 * | 7/2003 | Redlich | ................. | H04L 69/161 370/466 |
| 8,213,299 B2 * | 7/2012 | Soncodi | .................... | H04L 1/22 370/218 |
| 10,079,839 B1 * | 9/2018 | Bryan | ................... | G06F 3/0481 |
| 2009/0080447 A1 * | 3/2009 | Sawada | ............... | H04L 61/2046 370/392 |
| 2013/0091279 A1 * | 4/2013 | Haddad | ................. | H04W 12/06 709/225 |
| 2013/0136089 A1 * | 5/2013 | Gillett | ................. | H04W 72/048 370/329 |
| 2014/0114139 A1 * | 4/2014 | Ziolo | ................... | A61B 17/025 600/233 |
| 2014/0328161 A1 * | 11/2014 | Haddad | ................... | H04L 69/40 370/219 |
| 2015/0263891 A1 * | 9/2015 | Baugher | ............. | H04L 41/5041 370/254 |
| 2015/0334034 A1 * | 11/2015 | Smedley | ................. | H04L 49/10 709/219 |
| 2021/0136177 A1 * | 5/2021 | Hall | ........................ | H04L 67/59 |

* cited by examiner

*Primary Examiner* — Liang Che A Wang
(74) *Attorney, Agent, or Firm* — Dority & Manning, P.A.

(57) ABSTRACT

A first router obtains a first network address of a first local area network (LAN) implemented by a second router and a first subnet mask associated with the first LAN. The first router causes the establishment of a secure communications channel with the second router. The first router determines that a computing device seeks to join the first LAN. The first router obtains an internet protocol (IP) address that has a same network address as the first network address and sends, to the computing device, the IP address and the first subnet mask for use by the computing device.

20 Claims, 8 Drawing Sheets

EXTENDING A LOCAL AREA NETWORK SECURELY

BACKGROUND

A computing device that is connected to a local area network can discover and communicate with other computing devices that are connected to the same local area network, and can communicate with such devices using link layer addresses, such as media access control (MAC) addresses. Many applications will limit functionality to only those computing devices on the same local area network, such as media streaming applications, storage device access, and the like.

SUMMARY

The embodiments disclosed herein securely extend layer 2 connectivity of a first local area network (LAN) to a computing device that is directly connected to a second network, such that the computing device can connect to the second network and have the same functionality that the computing device has when directly connected to the first LAN.

In one embodiment a method is provided. The method includes obtaining, by a first router, a first network address of a first local area network (LAN) implemented by a second router and a first subnet mask associated with the first LAN. The method further includes causing, by the first router, the establishment of a secure communications channel with the second router. The method further includes determining, by the first router, that a computing device seeks to join the first LAN. The method further includes obtaining, by the first router, an internet protocol (IP) address that has a same network address as the first network address and sending, by the first router to the computing device, the IP address and the first subnet mask for use by the computing device.

In another embodiment a router is provided. The router includes a memory and a processor device coupled to the memory to obtain a first network address of a first local area network (LAN) implemented by a second router and a first subnet mask associated with the first LAN. The processor device is further to cause the establishment of a secure communications channel with the second router. The processor device is further to determine that a computing device seeks to join the first LAN. The processor device is further to obtain an internet protocol (IP) address that has a same network address as the first network address and send, to the computing device, the IP address and the first subnet mask for use by the computing device.

In another embodiment a non-transitory computer-readable storage medium is provided. The non-transitory computer-readable storage medium includes executable instructions configured to cause a processor device to obtain a first network address of a first local area network (LAN) implemented by a second router and a first subnet mask associated with the first LAN. The instructions are further configured to cause the processor device to cause the establishment of a secure communications channel with the second router. The instructions are further configured to cause the processor device to determine that a computing device seeks to join the first LAN. The instructions are further configured to cause the processor device to obtain an internet protocol (IP) address that has a same network address as the first network address and send, to the computing device, the IP address and the first subnet mask for use by the computing device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first router" and "second router," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A computing device that is connected to a local area network (LAN) can discover and communicate with other computing devices that are connected to the same LAN, and can communicate with such devices using link layer addresses, such as media access control (MAC) addresses. Many applications limit functionality to only those computing devices on the same LAN, such as media streaming applications, storage device access, and the like. A computing device that is connected to a LAN may also be subject to rules enforced by a firewall, such as being prohibited from accessing certain websites.

When a computing device normally connected to a first LAN is later connected to a second LAN, such as an office LAN or a hotel LAN, the computing device no longer has the same connectivity to devices on the first LAN, and is no longer subject to the rules enforced by the firewall on the first LAN. Moreover, network discovery by the computing device, while connected to the second LAN, will result in the computing device determining that none of the computing devices that were previously accessible on the first LAN are accessible on the second LAN. This will inhibit any connectivity to any computing device on the first LAN that was based on layer 2 connectivity.

The embodiments disclosed herein securely extend layer 2 LAN connectivity of a first LAN to a computing device that is directly connected to a second LAN, such that the computing device can connect to the second LAN and have the same functionality that the computing device has when directly connected to the first LAN. The second LAN may be separated from the first LAN by large distances and any number of intermediate networks, all of which is transparent to the computing device. Thus, even though not directly connected to the first LAN, the computing device "sees" the computing devices on the first LAN exactly as the computing device would see the computing devices if connected directly to the first LAN.

Figure 1A:
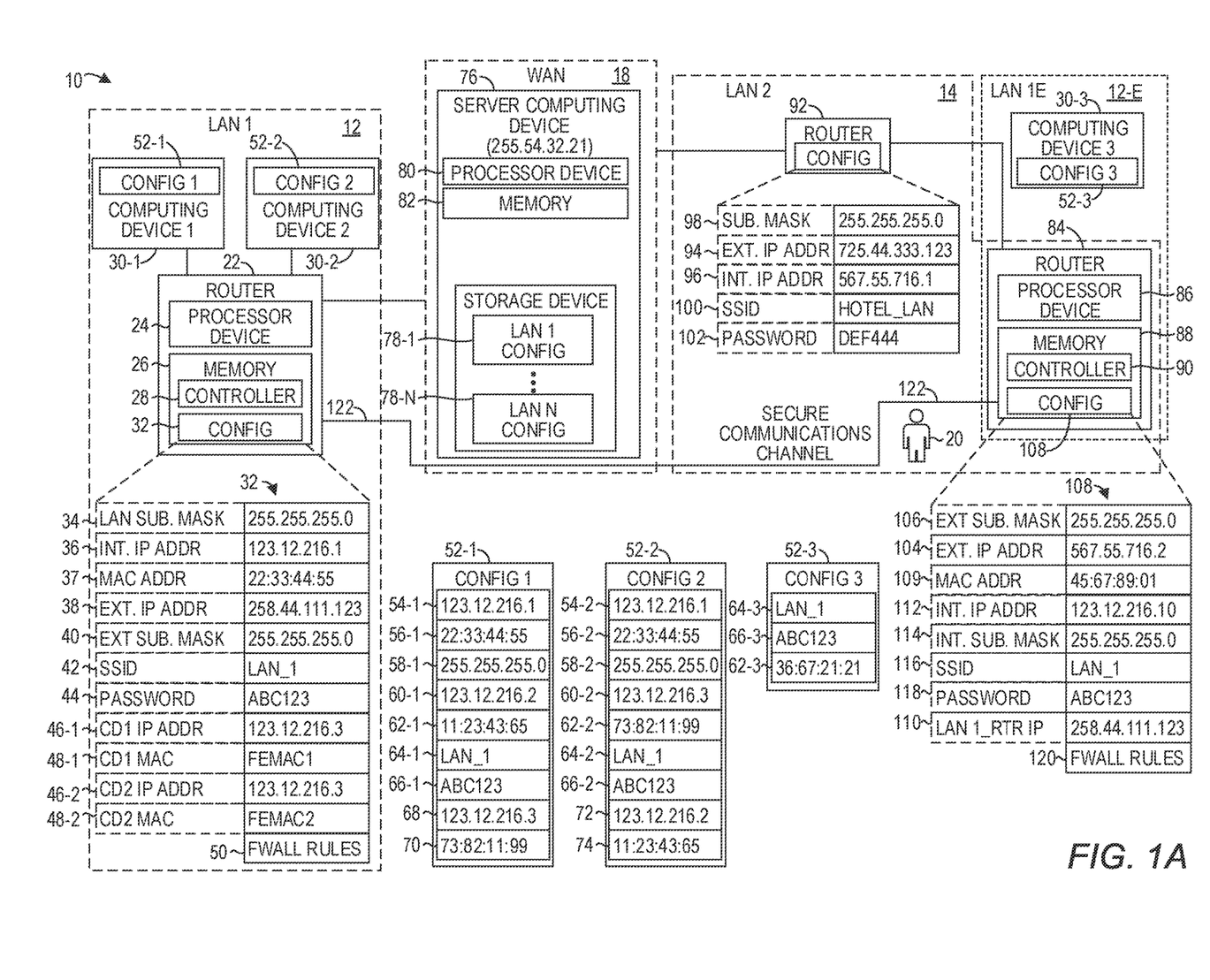
FIGS. 1A-1B are block diagrams of an environment suitable for extending a local area network (LAN) securely according to one embodiment.

FIG. 1A is a block diagram of an environment 10 suitable for extending a LAN securely according to one embodiment. The environment 10 includes three LANS 12, 14 and 12-E, and a wide area network (WAN) 18. The WAN 18 will be discussed herein as a single network for the sake of simplicity but, in practice, may comprise any number of inter-connected networks. The term "network" as used herein, particularly with reference to LANs, refers to a set of inter-connected computing devices that share a same network address, and thus have data link layer, sometimes referred to as layer 2, access to one another. The set of computing devices may include a router and any computing devices that are wirelessly connected or cable connected to the router, either directly or via intermediate layer 2 devices, such as a switch or bridge, and that have the same network address. The term "network address" refers to that portion of an IP address that constitutes the network address based on a corresponding subnet mask. As an example, an IP address of 123.12.12.12 that has a corresponding subnet mask of 255.255.255.0 has a network address of 123.12.12.0. A host IP address on such network may be, for example, 123.12.12.43. Another host IP address on such network may be, for example, 123.12.12.56. A host IP address of 123.12.13.56 that utilizes the subnet mask of 255.255.255.0 is on a different network, in particular, a network that has a network address of 123.12.13.0. The term "host IP address" as used herein refers to an IP address of a computing device on, or connected to, the network. The terms "on the network" or "connected to the network" refers to a computing device that has a host IP address that has the same network address as other computing devices connected to the same network, and the same network address as the router that implements the network.

The LAN 12 may be a home network of a user 20. The LAN 12 is implemented via a router 22, which includes a processor device 24 and a memory 26. The router 22 implements conventional router functionality as well as additional functionality, as described in greater detail herein. Such functionality and additional functionality may be represented as being implemented by a controller 28; however, because the controller 28 is a component of the router 22, functionality implemented by the controller 28 may be attributed to the router 22 generally. Moreover, in examples where the controller 28 comprises software instructions that program the processor device 24 to carry out functionality discussed herein, functionality implemented by the controller 28 may be attributed herein to the processor device 24.

At the point in time illustrated in FIG. 1A, two computing devices 30-1, 30-2 are connected to the router 22 and are on the same LAN 12. The computing devices 30-1, 30-2 may be wirelessly connected to the router 22 or cable connected to the router 22 via ethernet ports of the router 22.

The router 22 maintains configuration information 32. The configuration information 32 may include, by way of non-limiting example, a subnet mask 34 that defines the network address portion of IP addresses allocated by the router 22 to the computing devices 30-1-30-2. Such IP addresses may be allocated, for example, in response to Dynamic Host Configuration Protocol (DHCP) requests from the computing devices 30-1-30-2. The configuration information 32 may include an internal IP address 36 of the router 22. The internal IP address 36 is the IP address of the router 22 from the perspective of the computing devices 30-1, 30-2, and is provided as the address of the default gateway to the computing devices 30-1, 30-2 so that the computing devices 30-1, 30-2 can communicate with computing devices on other networks. For example, if the computing device 30-1 desires to communicate with a computing device having an IP address that is not on the LAN 12, the computing device 30-1 sends packets destined to such computing device to the router 22 for routing to such computing device. The configuration information 32 may include a layer 2 address of the router 22, such as a MAC address 37, via which the computing devices 30-1, 30-2 can communicate with the router 22.

The configuration information 32 may include an external IP address 38 via which the router 22 can communicate with routers on other networks, such as a router in the WAN 18. The configuration information 32 may also include an external subnet mask 40 that defines the network address portion of the external IP address 38 so that the router 22 can determine what other device or devices are on the same network as that of the external IP address 38. While for purposes of simplicity and illustration it will be assumed that all networks discussed herein use a subnet mask of 255.255.255.0, it is noted that, in practice, some networks, particularly larger networks, may utilize a different subnet mask to allow a larger number of computing devices to be layer-2 connected to one another.

The configuration information 32 may include a Service Set Identifier (SSID) 42 of the LAN 12 and a password 44 associated with the LAN 12 which may be used to allow the computing devices 30-1, 30-2 to securely join the LAN 12. For example, the router 22 may continuously broadcast the SSID 42. The computing device 30-1 may be configured to detect the broadcast of the SSID 42 and, upon detecting the SSID 42, automatically provide to the router 22 the password 44, and thereby automatically join the LAN 12. If the computing device 30-1 provided a different password, the router 22 would prevent the computing device 30-1 from joining the LAN 12.

The configuration information 32 may also maintain IP addresses 46-1, 46-2 of the connected computing devices 30-1, 30-2, respectively, and MAC addresses 48-1, 48-2 of the connected computing devices 30-1, 30-2, respectively. The configuration information 32 may also identify one or more firewall rules 50 that, for example, may preclude the computing devices 30-1, 30-2 from accessing certain destination devices that have certain associated domain names, IP addresses, or the like.

The computing device 30-1 may maintain configuration information 52-1 that facilitates communications with other computing devices, whether on the LAN 12 or on another network. For example, the configuration information 52-1 may include a gateway router IP address 54-1 that identifies the IP address of the router 22. A gateway router MAC address 56-1 identifies the layer 2 address of the router 22. A subnet mask 58-1 matches the subnet mask 34. The configuration information 52-1 may include an IP address 60-1 of the computing device 30-1, a MAC address 62-1 of the computing device 30-1, an SSID 64-1 that matches the SSID 42, and a password 66-1 that matches the password 44. The computing device 30-1 may use the SSID 64-1 and password 66-1 to, for example, connect to the LAN 12.

The configuration information 52-1 may also include information about other computing devices that are connected to the LAN 12, such as an IP address 68 of the computing device 30-2 and a MAC address 70 of the computing device 30-2.

The computing device 30-2 may also maintain configuration information 52-2 that facilitates communications with other computing devices, whether on the LAN 12 or on another network. For example, the configuration information 52-2 may include a gateway router IP address 54-2 that identifies the IP address of the router 22. A gateway router MAC address 56-2 identifies the layer 2 address of the router 22. A subnet mask 58-2 matches the subnet mask 34. The configuration information 52-2 may include an IP address 60-2 of the computing device 30-2, a MAC address 62-2 of the computing device 30-2, an SSID 64-2 that matches the SSID 42, and a password 66-2 that matches the password 44. The configuration information 52-2 may also include information about other computing devices that are connected to the LAN 12, such as an IP address 72 of the computing device 30-1 and a MAC address 74 of the computing device 30-1.

The router 22 is communicatively coupled to a server computing device 76 via one or more intermediary devices (not illustrated). The server computing device 76 may comprise, by way of non-limiting example, a computing device of a service provider that provides broadband communication services to the residence in which the LAN 12 is located. The server computing device 76 is on a different network than the LAN 12. Periodically, intermittently, or upon the occurrence of certain events, the router 22 may provide all or some of the information maintained in the configuration information 32 to the server computing device 76. The server computing device 76 may maintain such information as configuration information 78-1. The server computing device 76 may maintain a plurality of configuration information 78-1-78-N (generally, configuration information 78), each configuration information 78 corresponding to a different subscriber. The server computing device 76 also includes a processor device 80 and a memory 82.

The user 20 operates a portable router 84 (hereinafter router 84 for the sake of brevity). The router 84 includes a processor device 86 and a memory 88. The router 84 may implement conventional router functionality as well as additional functionality, as described in greater detail herein. Such functionality and additional functionality may be represented as being implemented by a controller 90; however, because the controller 90 is a component of the router 84, functionality implemented by the controller 90 may be attributed to the router 84 generally. Moreover, in examples where the controller 90 comprises software instructions that program the processor device 86 to carry out functionality discussed herein, functionality implemented by the controller 90 may be attributed herein to the processor device 86.

For purposes of illustration, assume that the user 20 travels with the router 84 to a remote location, such as a hotel room or other venue, and powers on the router 84. The hotel room includes a conventional wired and or wireless router 92 that is on an external network identified by an IP address 94 that is different from the LAN 12 and different from the network to which the server computing device 76 is connected. The router 92 implements the LAN 14 and has an internal IP address 96. The LAN 14 has a network address of 567.55.716.0, which is determined based on a subnet mask 98 of the LAN 14 and the internal IP address 96.

The router 92 broadcasts an SSID 100, and requires a password 102 to allow a wireless device to join the LAN 14. The user 20 may interact with the router 84 via a display device (not illustrated) of the router 84 and an input device (not illustrated), or may interact with the router 84 via another device, such as a smart phone (not illustrated) that connects wirelessly to the router 84 via Bluetooth® or the like, and communicates with the router 84 via an application executing on the smart phone. The router 84 detects the SSID 100, and the user 20 provides the router 84 the appropriate password to match the password 102. The router 84 properly authenticates with the router 92 and joins the LAN 14. The router 92 provides the router 84 an IP address 104 that is on the LAN 14 and a subnet mask 106. In this example, the LAN 14 has a network address of 567.55.716.0.

The user 20 causes the router 84 to connect to the server computing device 76 and provides authentication information to the server computing device 76, such as a subscriber identifier of the user 20 and a password of the user 20. The server computing device 76 authenticates the router 84, and determines, based on information received from the router 84, that the configuration information 78-1 corresponds to the user 20. The server computing device 76 sends the configuration information 78-1 to the router 84. The router 84 maintains a collection of configuration information 108 which may include certain information obtained from the router 92 during the connection with the router 92, such as the IP address 104 and the subnet mask 106. The configuration information 108 may also include certain preconfigured information of the router 84, such as a MAC address 109 of the router 84. The router 84 may also store the configuration information 78-1 received from the server computing device 76 as part of the configuration information 108. While for purposes of space limitations the configuration information 108 is illustrated as containing only some of the information maintained in the configuration information 32, in practice, all of the configuration information 32 maintained by the router 22 may be stored in the configuration information 78-1 and subsequently provided to the router 84 and stored in the configuration information 108.

The information received from the server computing device 76 and maintained in the configuration information 108 may include an external IP address 110 that identifies the external IP address of the router 22 and an internal subnet mask 114 that identifies the subnet mask 34 used by the router 22 for the LAN 12. The configuration information 108 may also include an SSID 116 and password 118 that match the SSID 42 and password 44 of the LAN 12. The configuration information 108 may also include firewall rules 120 that match the firewall rules 50 of the configuration information 32 of the router 22. The router 84 causes the establishment of a secure communications channel 122 with the router 22. The router 84 may cause the establishment of the secure communications channel 122 by directly establishing the secure communications channel 122 with the router 22, such as an IPsec tunnel or the like. In other embodiments, the router 84 causes the server computing device 76 to establish the secure communications channel 122 with the router 22 by virtue of the router 84 obtaining the configuration information 78-1 from the server computing device 76. For example, the server computing device 76 may establish reverse Secure Shell (SSH) tunnels with the router 22 and the router 84, and subsequently route traffic between the router 22 and the router 84. The router 84 may exchange messages with the router 22 to obtain an IP address 112 for the router 84 that is on the LAN 12. The IP address 112 can be used as the IP address of the default gateway for the LAN 12-E.

The router 84 may broadcast the SSID 116 in the hotel room to establish the LAN 12-E as an extension of the LAN 12. The user 20 has a computing device 30-3 located in the hotel room, such as a laptop computer, a computing tablet, a smart phone, or the like, that is typically connected to the LAN 12. Because the computing device 30-3 may previously have been configured to automatically join the LAN 12, upon initialization of the computing device 30-3, configuration information 52-3 of the computing device 30-3 may have an SSID 64-3 that matches the SSID 42 of the LAN 12, and a password 66-3 that matches the password 44 of the router 22. The configuration information 52-3 may also include a MAC address 62-3 of the computing device 30-3.

Figure 1B:
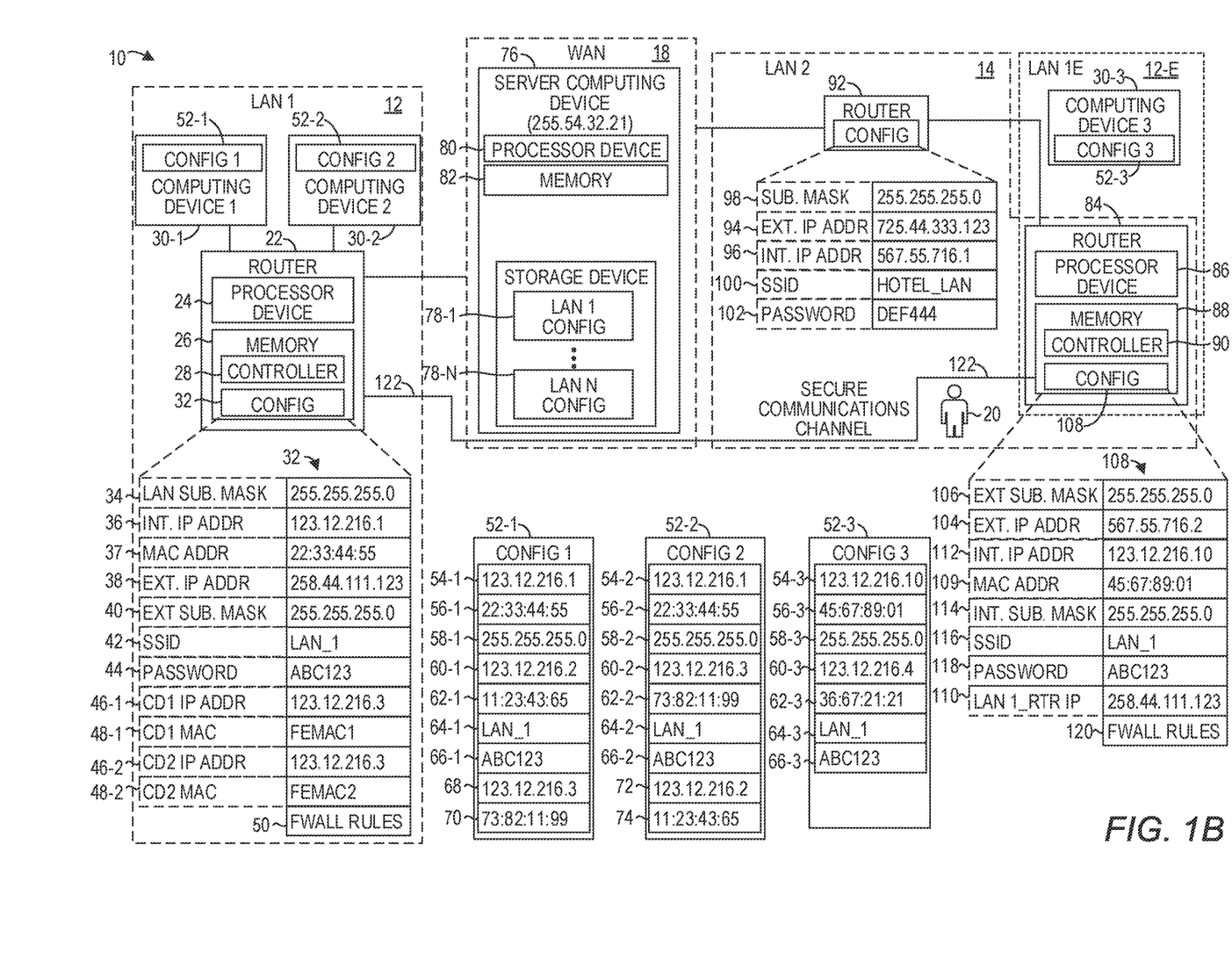

Referring now to FIG. 1B, the computing device 30-3 recognizes the SSID 116 being broadcast by the router 84 because the SSID 116 is identical to the SSID 42 that is broadcast by the router 22. The computing device 30-3 provides the password 66-2 to the router 84. The router 84 compares the provided password 66-2 to the password 118 received from the server computing device 76 and allows the computing device 30-3 to join the LAN 12-E. The computing device 30-3 may broadcast a DHCP Discover message to determine the DHCP server of the LAN 12-E so that the computing device 30-3 can obtain an IP address, a subnet mask, and an address of the default gateway of the LAN 12-E. The term "broadcast" in this context refers to a message addressed to a MAC address of FF:FF:FF:FF:FF, the default MAC broadcast address.

The router 84 receives the DHCP Discover message. The router 84 may send the DHCP Discover message to the router 22 via the secure communications channel 122 for processing. In one embodiment, the router 22 receives the message, and generates a DHCP Offer message that includes the IP address 36 of the router 22 as the DHCP server, the LAN subnet mask 34, the IP address 36 of the router 22 as the default gateway, and any other suitable information that may be provided in a DHCP Offer message. The router 22 sends the DHCP Offer message to the router 84 via the secure communications channel 122. The router 84 sends the DHCP Offer message to the computing device 30-3. A subsequent DHCP Request message sent by the computing device 30-3 and DHCP ACK message sent by the router 22 may be handled similarly, with the router 84 transparently communicating such messages between the computing device 30-3 and the router 22 via the secure communications channel 122.

In another embodiment, the router 84 receives the DHCP Discover message and processes the DHCP Discover message, and subsequent DHCP communications, with the computing device 30-3 itself. The router 84 may first synchronize with the router 22 to identify all allocated IP addresses on the LAN 12, so that the router 84 can allocate an unallocated IP address to the computing device 30-3. The router 84 may identify itself as the DHCP server and the default gateway for the computing device 30-3. When complete, the router 84 may send the router 22 a message indicating that the computing device 30-3 has joined the LANs 12, 12-E. The message may include the MAC address 62-3 of the computing device 30-3, the allocated IP address of the computing device 30-3, and the IP address 112 of the router 84 as the IP address of the default gateway. At the end of the DHCP process, whether processed by the router 22 or the router 84, the configuration information 52-3 now includes a gateway router IP address 54-3 that identifies the IP address of the router 84. A gateway router MAC address 56-3 identifies the layer 2 address of the router 84. A subnet mask 58-3 matches the subnet mask 34. An IP address 60-3 identifies the IP address given to the computing device 30-3.

Subsequent traffic from the computing devices 30-1-30-3 is transparently and securely bridged between the router 22 and the router 84 such that the computing devices 30-1-30-2 will see the computing device 30-3 as being directly connected to the LAN 12, and the computing device 30-3 will see the computing devices 30-1-30-2 as being directly connected to the LAN 12-E. As an example, assume that the computing device 30-3 has preconfigured information that identifies the computing device 30-2 as a streaming media server, and the computing device 30-3 has configuration information that identifies the IP address 60-2 of the computing device 30-2. The computing device 30-3, using the subnet mask 58-3, determines that the computing device 30-2 is on the same network as the computing device 30-3. The computing device 30-3 generates an Address Resolution Protocol (ARP) request message containing the IP address 60-2 of the computing device 30-2 and broadcasts the ARP request message to the MAC broadcast address. The router 84 receives the ARP request message and sends the ARP request message to the router 22. The router 22 broadcasts the ARP request message on the LAN 12 using the MAC address and IP address of the computing device 30-3. The computing device 30-2 receives the ARP request message and determines that the ARP request message contains the IP address 60-2 of the computing device 30-2. The computing device 30-2 generates an ARP reply message that identifies the MAC address 62-2 of the computing device 30-2 and addresses the ARP reply message to the MAC address 62-3 of the computing device 30-3. The router 22 receives the ARP reply message and sends the ARP reply message to the router 84. The router 84 sends the ARP reply message to the computing device 30-3. The computing device 30-3 may then subsequently direct unicast messages to the MAC address 62-2 of the computing device 30-2, and the computing device 30-2 may send unicast messages directly to the computing device 30-3 using the MAC address 62-3.

The router 22 and the router 84 synchronize LAN activity with one another so that the router 22 and the router 84 are aware of the devices connected to the LAN 12 and the LAN 12-E. For example, upon a new computing device connecting to the LAN 12, the router 22 sends a message to the router 84 providing the IP address and MAC address of the new computing device.

Assume that the computing device 30-3 initiates a request to the router 84, as the default gateway router, to access an IP address that is not on the LAN 12-E. The router 84 accesses the firewall rules 120 and determines that the IP address is on a list of blocked IP addresses. The router 84 rejects the request and prevents the computing device 30-3 from accessing the IP address.

Assume that the computing device 30-3 next initiates a request to the router 84, as the default gateway router, to access a different IP address that is not on the LAN 12-E. The router 84 accesses the firewall rules 120 and determines that the IP address is not on the list of blocked IP addresses. The router 84 then sends the message to the router 92, outside of the secure communications channel 122, for subsequent routing to the destination device.

Figure 2:
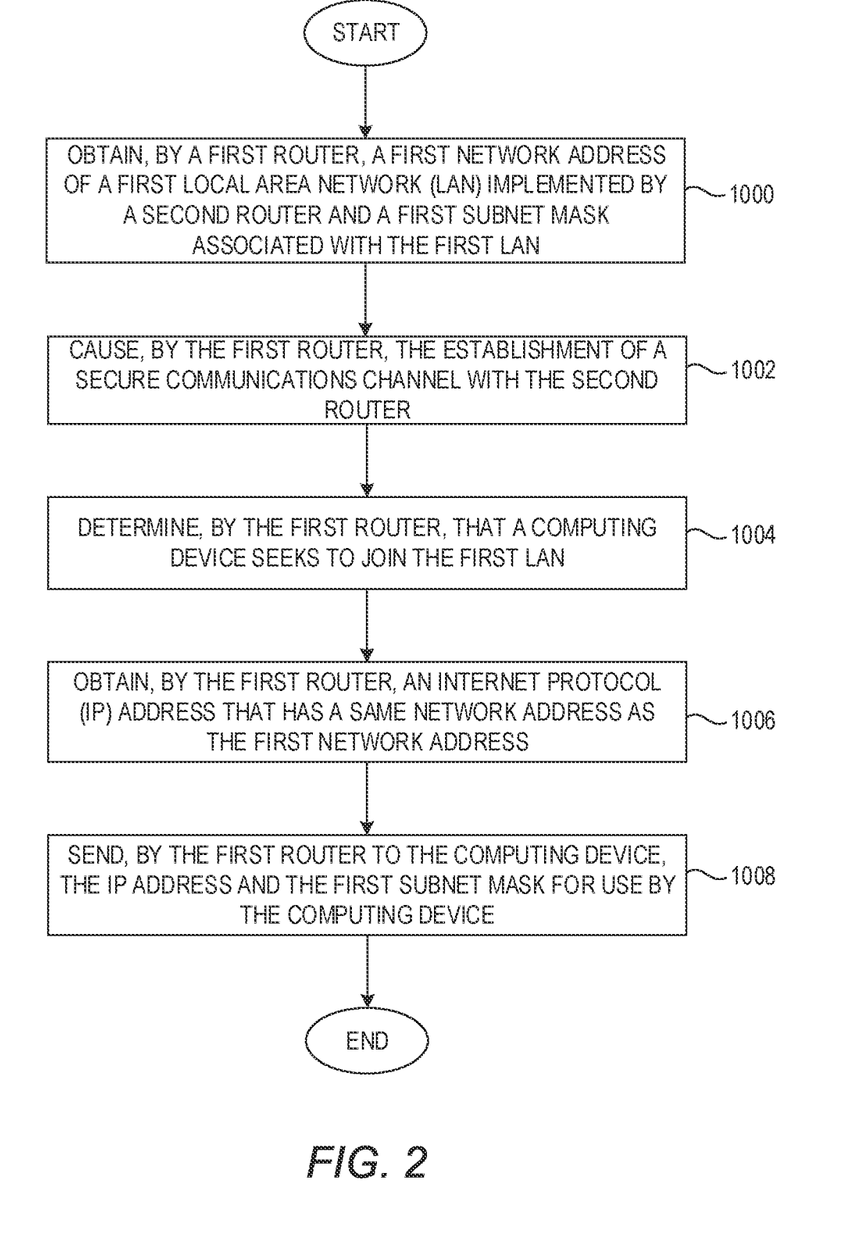
FIG. 2 is a flowchart of a method for extending a local area network (LAN) securely according to one embodiment.

FIG. 2 is a flowchart of a method for extending a local area network securely according to one embodiment. FIG. 2 will be discussed in conjunction with FIGS. 1A and 1B. The router 84 obtains the network address of the LAN 12, implemented by the router 22, and the subnet mask 34 associated with the LAN 12 (FIG. 2, block 1000). The router 84 causes the establishment of the secure communications channel 122 with the router 22 (FIG. 2, block 1002). The router 84 determines that the computing device 30-3 seeks to join the LAN 12 (FIG. 2, block 1004). The router 84 obtains the internet protocol (IP) address 60-3 that has a same network address as the network address of the LAN 12 (FIG. 2, block 1006). The router 84 sends, to the computing device 30-3, the IP address 60-3 and the subnet mask 34 for use by the computing device 30-3 (FIG. 2, block 1008).

Figure 3A:
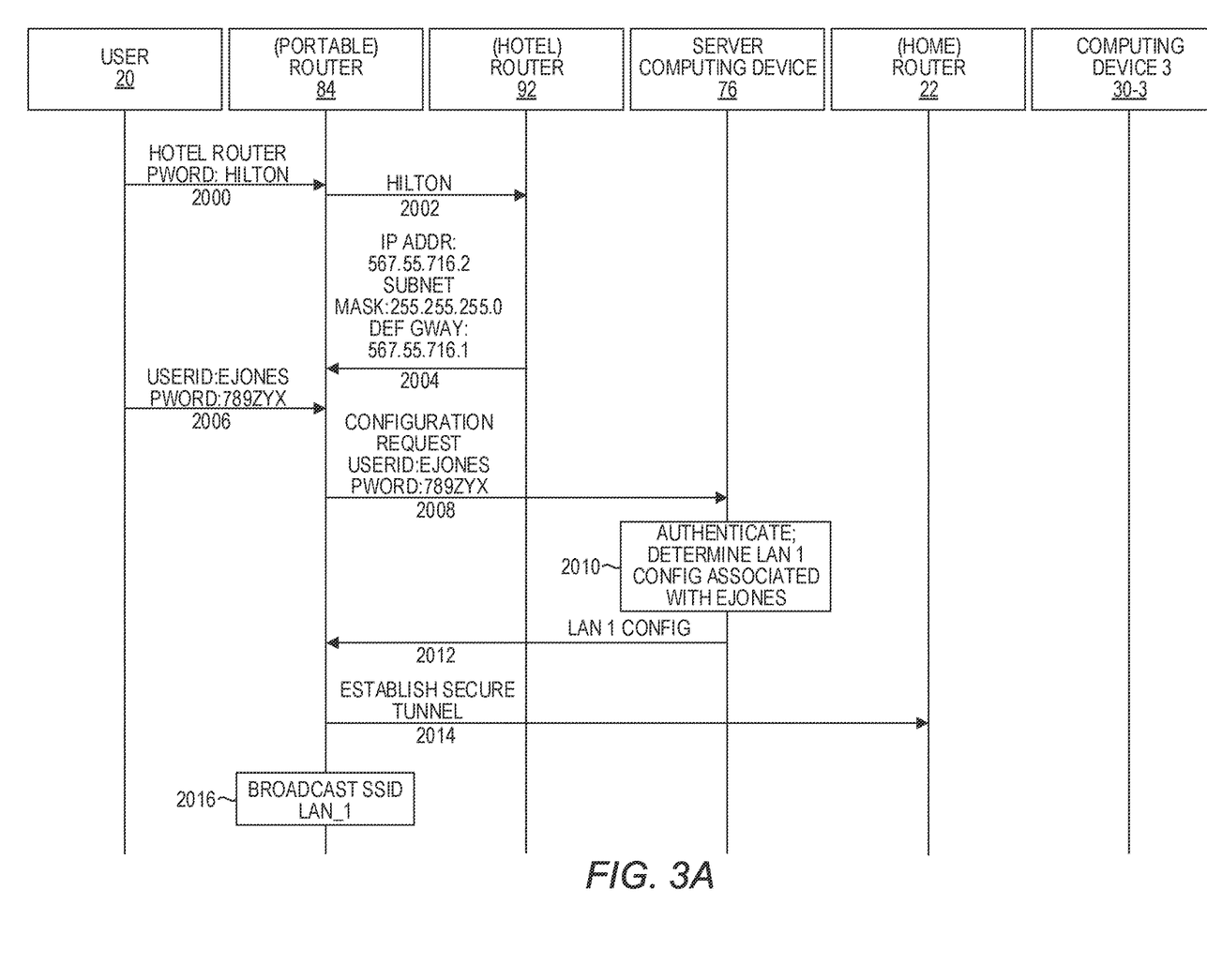
FIGS. 3A-3B illustrate a message sequence diagram for extending a LAN securely utilizing the environment illustrated in FIGS. 1A-1B according to one embodiment.

FIGS. 3A-3B illustrate a message sequence diagram for extending a local area network securely according to one embodiment. For purposes of discussion, the router 84 will be referred to as the "portable router 84", the router 92 as the "hotel router 92", and the router 22 as the "home router 22" throughout FIGS. 3A-3B. For purposes of illustration, assume that the user 20 travels to a hotel room and brings the portable router 84. The user 20 powers on the portable router 84 in the hotel room and the portable router 84 detects the SSID of the hotel router 92. The user 20 provides the password of the hotel router 92 to the portable router 84, and the portable router 84 provides the password to the hotel router 92 (FIG. 3A, steps 2000-2002). The portable router 84 and the hotel router 92 may exchange one or more DHCP messages, resulting in the hotel router 92 providing the portable router 84 an IP address 104 (FIG. 1A) on the hotel LAN 14, a subnet mask 106 of the hotel LAN 14, and an IP address 96 of the hotel router 92 as the IP address of the default gateway for the portable router 84 (FIG. 3A, step 2004).

The user 20 provides the portable router 84 a subscriber identifier and password associated with the user 20 (FIG. 3A, step 2006). The portable router 84 sends a request for configuration information to the server computing device 76 and provides the subscriber identifier and password (FIG. 3A, step 2008). The server computing device 76 authenticates the subscriber identifier and password, and determines that the configuration information 78-1 is associated with the user 20 based on the subscriber identifier (FIG. 3A, step 2010).

The server computing device 76 provides the configuration information 78-1 to the portable router 84 (FIG. 3A, step 2012). The portable router 84 receives the configuration information 78-1 and causes the establishment of the secure communications channel 122 with the home router 22 (FIG. 3A, step 2014). The portable router 84 may cause the establishment of the secure communications channel 122 with the home router 22 directly or indirectly. In some embodiments, the portable router 84 may communicate directly with the home router 22 to establish the secure communications channel 122, such as an IPsec channel, or the like. In other embodiments, the initial request by the portable router 84 may cause the server computing device 76 to establish the secure communications channel 122, such as by establishing reverse SSH tunnels with each of the portable router 84 and the home router 22, and subsequently bridging communications between the portable router 84 and the home router 22.

Figure 3B:
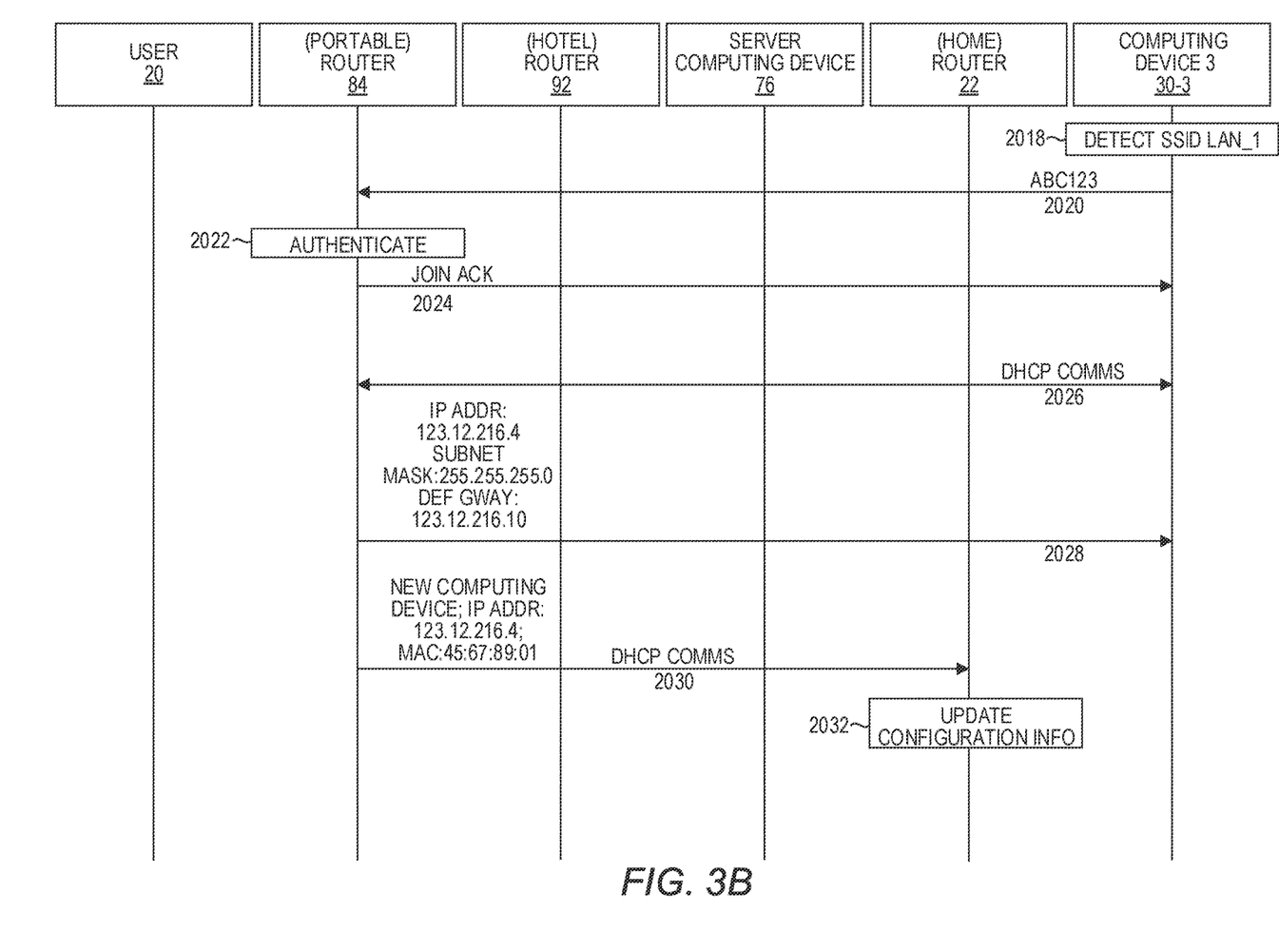

The portable router 84 begins broadcasting the SSID 116 of the LAN 12 in the hotel room (FIG. 3A, step 2016). Referring now to FIG. 3B, the computing device 30-3 detects the SSID 116 of the LAN 12 in the hotel room (FIG. 3B, step 2018). The computing device 30-3 provides the password 66-3 of the LAN 12 to the portable router 84 (FIG. 3B, step 2020). The portable router 84 authenticates the computing device 30-3 (FIG. 3B, step 2022). The portable router 84 sends a message to the computing device 30-3 indicating that the computing device 30-3 has joined the LAN 12-E (FIG. 3B, step 2024).

A series of DHCP communications ensues (FIG. 3B, step 2026). The portable router 84 provides the computing device 30-3 the IP address 60-3 (FIG. 1B), the subnet mask 58-3, and the IP address of the portable router 84 as the IP address of the default gateway of the LAN 12-E (FIG. 3B, step 2028). The portable router 84 sends a message to the home router 22 with information identifying the computing device 30-3 to inform the home router 22 that the computing device 30-3 has joined the extended LAN 12-E (FIG. 3B, step 2030). The home router 22 updates the configuration information 32 with the information identifying the computing device 30-3 (FIG. 3B, step 2032).

It is noted that although only the computing device 30-3 is shown as joining the LAN 12-E, there is no limit to the number of computing devices that may join the LAN 12-E. As an example, the user 20 may be in possession of a number of computing devices, such as the computing device 30-3, which may be, for example, a laptop computer, and may be in possession of a smartphone and a computing tablet. The smartphone and the computing tablet may similarly join the LAN 12-E and have access to the LAN 12 implemented by the home router 22 as described herein with regard to the computing device 30-3.

Thereafter, the portable router 84 communicates all intra-network traffic received from the computing device 30-3 that is destined for one or more computing devices on the LAN 12 to the home router 22 via the secure communications channel 122, whether such traffic is unicast, multicast or broadcast traffic, and the home router 22 communicates all intra-network traffic received from the computing devices 30-1-30-2 that is destined for the computing device 30-3 to the portable router 84 via the secure communications channel 122. As an example, any broadcast traffic from the computing device 30-3 is communicated by the portable router 84 to the home router 22, and any broadcast traffic initiated by the computing devices 30-1 or 30-2 is communicated from the home router 22 to the portable router 84.

Figure 4:
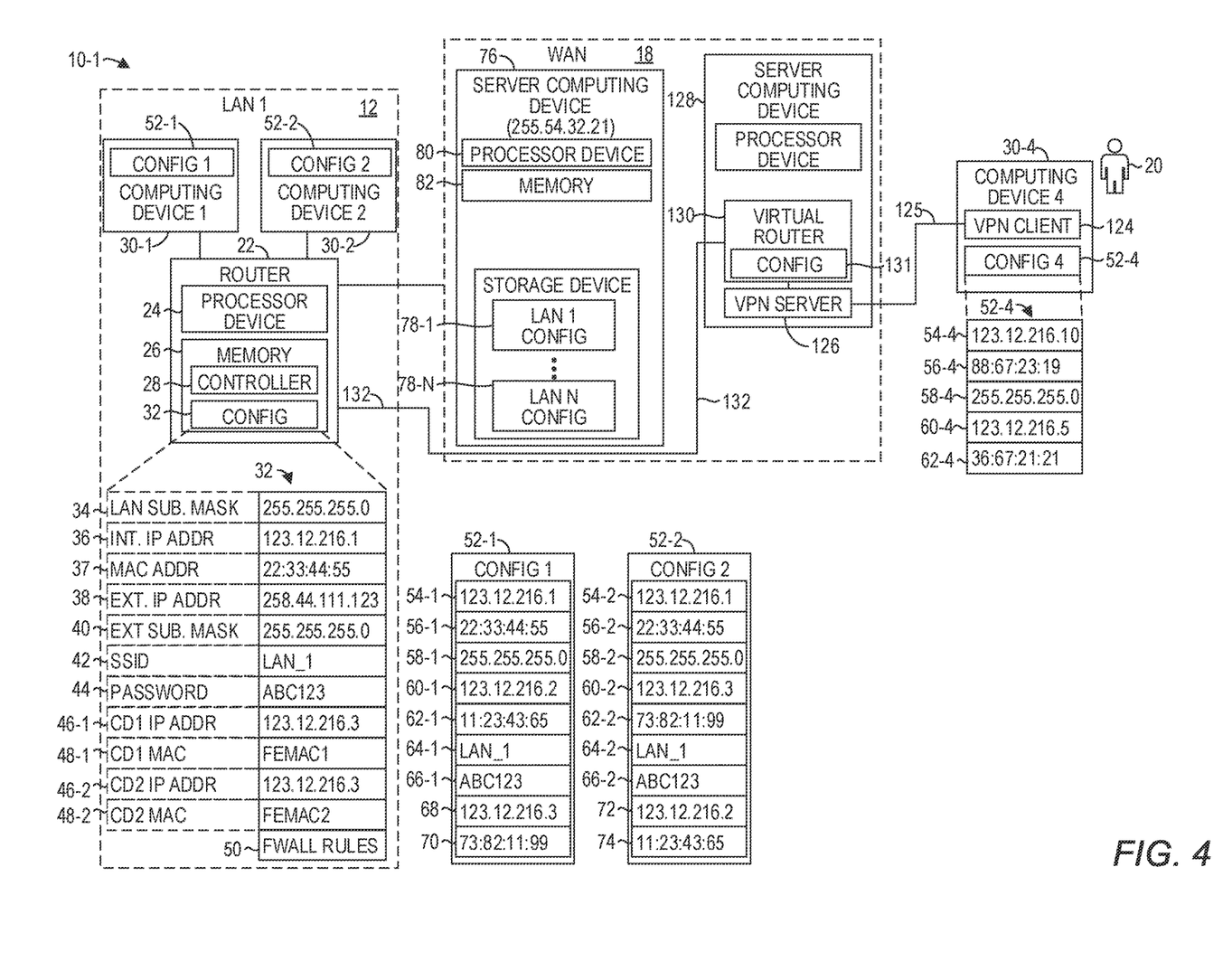
FIG. 4 is a block diagram of an environment suitable for extending a LAN securely according to another embodiment.

FIG. 4 is a block diagram of an environment 10-1 suitable for extending a LAN securely according to another embodiment. The environment 10-1 is substantially similar to the environment 10 discussed with regard to FIGS. 1A-1B, except as otherwise noted herein. In this embodiment, the user 20 has computing device 30-4 which may comprise, for example, a smartphone, a laptop computer, a computing tablet or the like. The user 20 enters input into the computing device 30-4 to cause a virtual private network client 124 to initiate a VPN 125 with a VPN server 126 executing on a server computing device 128 in the WAN 18. The communications between the computing device 30-4 and the VPN server 126 may be via Wi-Fi®, cellular technologies, or the like.

The VPN server 126 initiates, or causes the initiation of a virtual router 130. The virtual router 130 requests, via the VPN 125, user identifier information of the user 20. The user 20 provides a user identifier and a password. The virtual router 130 provides the user identifier and the password to the server computing device 128. The server computing device 128 authenticates the subscriber identifier and password, and determines that the configuration information 78-1 is associated with the user 20 based on the subscriber identifier. The server computing device 76 provides the configuration information 78-1 to the virtual router 130 which stores the configuration information 78-1 as part of a configuration information 131. The configuration information 131 includes, for example, the information illustrated with regard to the configuration information 108 in FIG. 1B. The virtual router 130 causes the establishment of a secure communications channel 132 with the home router 22.

The virtual router 130 provides the computing device 30-4 an IP address 60-4 for use by the computing device 30-4, a subnet mask 58-4, the IP address of the virtual router 130 as the IP address 54-4 of the default gateway for the computing device 30-4, and a MAC address 56-4 of the virtual router 130. The virtual router 130 sends a message to the home router 22 with information identifying the computing device 30-4 to inform the home router 22 that the computing device 30-4 has joined the LAN 12 via the virtual router 130. The home router 22 updates the configuration information 32 with the information identifying the computing device 30-4. The computing device 30-4 may also maintain a MAC address 62-4 of the computing device 30-4.

Thereafter, the virtual router 130 communicates all intra-network traffic received from the computing device 30-4 via the VPN 125 that is destined for one or more computing devices on the LAN 12 to the home router 22 via the secure communications channel 132, whether such traffic is unicast, multicast or broadcast traffic, and the home router 22 communicates all intra-network traffic received from the computing devices 30-1-30-2 that is destined for the computing device 30-4 to the virtual router 130 via the secure communications channel 132. The virtual router 130 communicates such information to the computing device 30-4 via the VPN 125.

Figure 5:
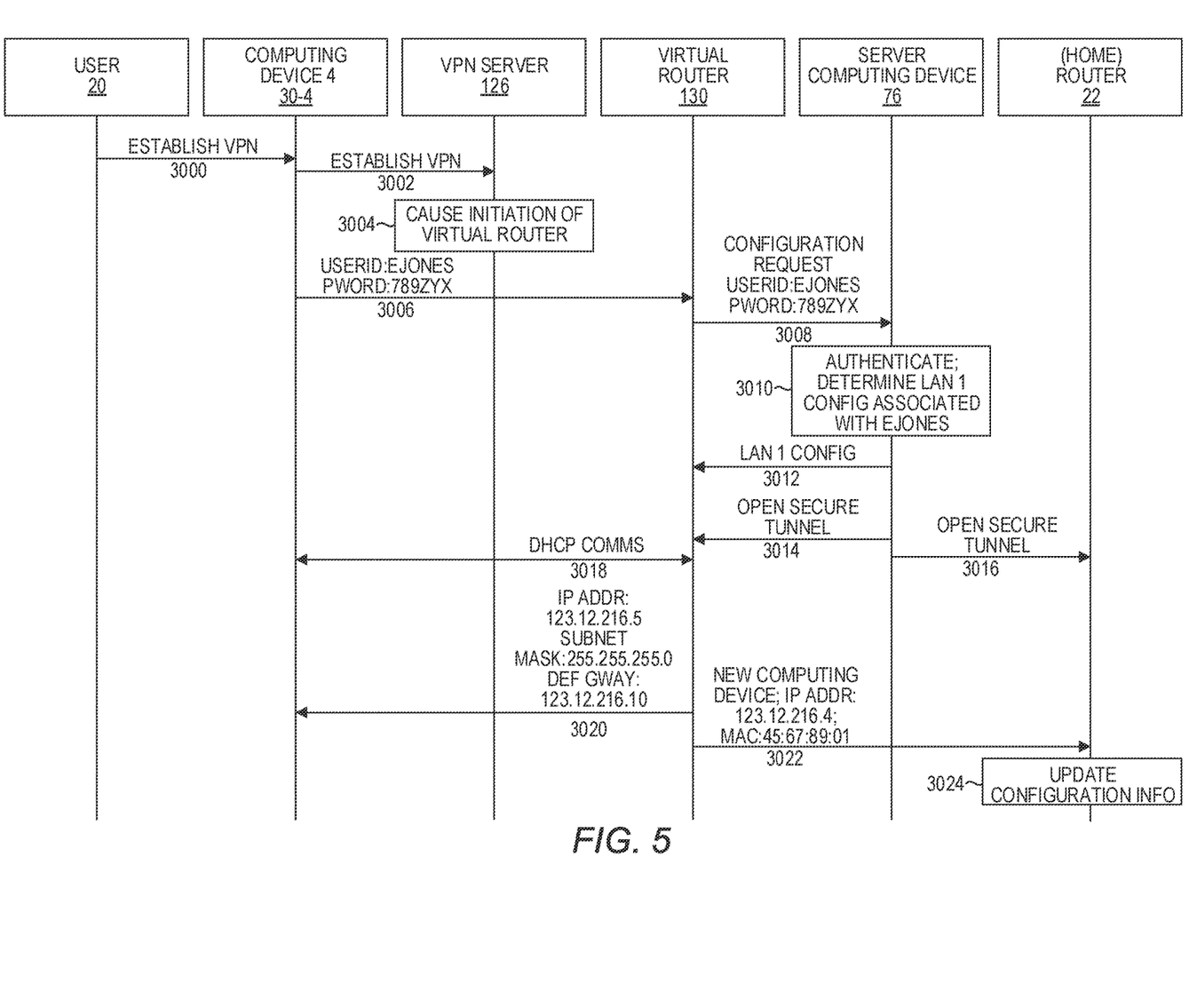
FIG. 5 illustrates a message sequence diagram for extending a LAN securely utilizing the environment illustrated in FIG. 4 according to one embodiment.

FIG. 5 illustrates a message sequence diagram for extending a local area network securely utilizing the environment illustrated in FIG. 4 according to one embodiment. In this embodiment, the user 20 manipulates the computing device 30-4 to cause the computing device 30-4 to establish a VPN with the VPN server 126 (FIG. 5, steps 3000-3002). The computing device 30-4 may have a cellular transceiver and communicates wirelessly with the VPN server 126 via a cellular network, or may utilize WiFi and communicate wirelessly with the VPN server 126 via intermediary devices such as a WiFi hotel router or the like.

In one embodiment the VPN server 126 may cause the initiation of the virtual router 130 (FIG. 5, step 3004). In other embodiments, the VPN server 126 may be part of the virtual router 130. The computing device 30-4 provides a subscriber identifier and password associated with the user 20 to the virtual router 130 (FIG. 5, step 3006). The virtual router 130 sends a request for configuration information to the server computing device 76 and provides the subscriber identifier and password (FIG. 5, step 3008). The server computing device 76 authenticates the subscriber identifier and password, and determines that the configuration information 78-1 is associated with the user 20 based on the subscriber identifier (FIG. 5, step 3010).

The server computing device 76 provides the configuration information 78-1 to the virtual router 130 (FIG. 5, step 3012). The server computing device 76 may then cause the generation of a secure tunnel, such as an SSH tunnel, between the server computing device 76 and the virtual router 130 (FIG. 5, step 3014). The server computing device 76 may also cause the generation of a secure tunnel, such as an SSH tunnel, between the server computing device 76 and the home router 22 (FIG. 5, step 3016). The two secure tunnels form the secure communications channel 132. In this embodiment, the server computing device 76 will bridge all communications between the virtual router 130 and the home router 22.

The virtual router 130 receives the configuration information 78-1 and a series of DHCP communications with the computing device 30-4 (FIG. 5, step 3018). The virtual router 130 provides the computing device 30-4 the IP address 60-4, the subnet mask 58-4, and the IP address of the virtual router 130 as the IP address of the default gateway (FIG. 5, step 3020). The virtual router 130 sends a message to the home router 22 with information identifying the computing device 30-4 to inform the home router 22 that the computing device 30-4 has joined the LAN 12 (FIG. 5, step 3022). The home router 22 updates the configuration information 32 with the information identifying the computing device 30-4 (FIG. 5, step 3024).

Thereafter, the virtual router 130 communicates all intra-network traffic received from the computing device 30-4 that is destined for one or more computing devices on the LAN 12 to the home router 22 via the secure communications channel 132, whether such traffic is unicast, multicast or broadcast traffic, and the home router 22 communicates all intra-network traffic received from the computing devices 30-1-30-2 that is destined for the computing device 30-4 to the virtual router 130 via the secure communications channel 132. As an example, any broadcast traffic from the computing device 30-4 is communicated by the virtual router 130 to the home router 22, and any broadcast traffic initiated by the computing devices 30-1 or 30-2 is communicated from the home router 22 to the virtual router 130.

Figure 6:
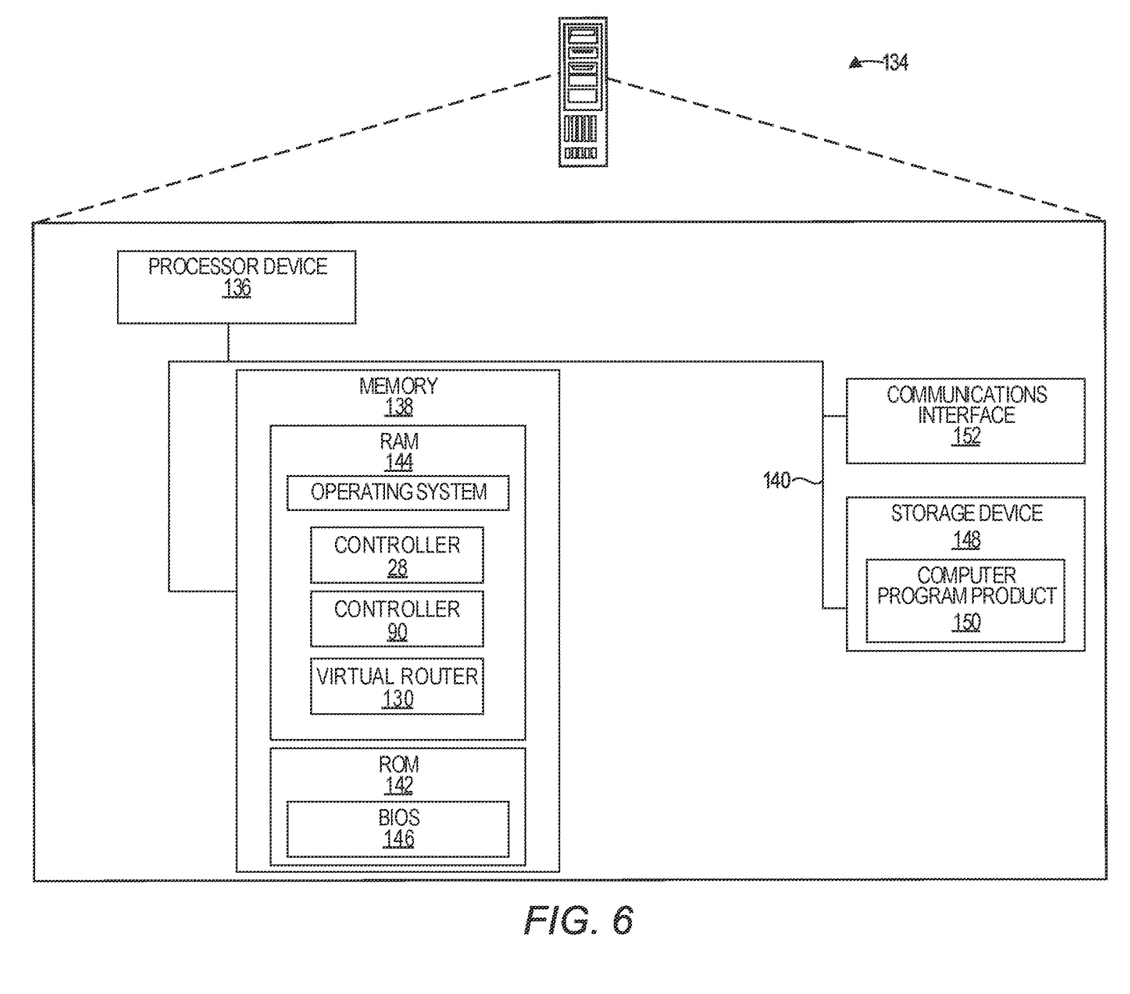
FIG. 6 is a block diagram of a computing device suitable for implementing routers and virtual routers disclosed herein.

FIG. 6 is a block diagram of a computing device 134 suitable for implementing the router 22, the router 84, or the virtual router 130. The computing device 134 may comprise any computing or electronic device capable of including firmware, hardware, and/or executing software instructions to implement the functionality described herein, such as a special purpose router device, a computer server, or the like. The computing device 134 includes a processor device 136, a memory 138, and a system bus 140. The system bus 140 provides an interface for system components including, but not limited to, the memory 138 and the processor device 136. The processor device 136 can be any commercially available or proprietary processor.

The system bus 140 may be any of several types of bus structures that may further interconnect to a memory bus (with or without a memory controller), a peripheral bus, and/or a local bus using any of a variety of commercially available bus architectures. The memory 138 may include non-volatile memory 142 (e.g., read-only memory (ROM), erasable programmable read-only memory (EPROM), electrically erasable programmable read-only memory (EEPROM), etc.), and volatile memory 144 (e.g., random-access memory (RAM)). A basic input/output system (BIOS) 146 may be stored in the non-volatile memory 142 and can include the basic routines that help to transfer information between elements within the computing device 134. The volatile memory 144 may also include a high-speed RAM, such as static RAM, for caching data.

The computing device 134 may further include or be coupled to a non-transitory computer-readable storage medium such as a storage device 148, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 148 and other drives associated with computer-readable media and computer-usable media may provide non-volatile storage of data, data structures, computer-executable instructions, and the like.

A number of modules can be stored in the storage device 148 and in the volatile memory 144, including an operating system and one or more program modules, such as the controller 28, the controller 90, or the virtual router 130, which may implement the functionality described herein in whole or in part.

All or a portion of the examples may be implemented as a computer program product 150 stored on a transitory or non-transitory computer-usable or computer-readable storage medium, such as the storage device 148, which includes complex programming instructions, such as complex computer-readable program code, to cause the processor device 136 to carry out the steps described herein. Thus, the computer-readable program code can comprise software instructions for implementing the functionality of the examples described herein when executed on the processor device 136.

The user 20 may also be able to enter user input through a keyboard (not illustrated), a pointing device such as a mouse (not illustrated), a touch-sensitive surface, or via another computing device that is connected to the computing device 134 via, for example, Bluetooth® or the like. The computing device 134 may also include a communications interface 152 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   obtaining, by a first router, an address of a second router that implements a first local area network (LAN);
   causing, by the first router, the establishment of a secure communications channel with the second router by using the address of the second router;
   determining, by the first router, that a computing device seeks to join the first LAN;
   obtaining, by the first router, an internet protocol (IP) address and a first subnet mask wherein the first subnet mask as applied to the IP address yields a same network address as a first network address of the first LAN; and
   sending, by the first router to the computing device, the IP address and the first subnet mask associated with the first LAN for use by the computing device.

2. The method of claim 1 further comprising:
   prior to obtaining the IP address, receiving, by the first router from the computing device, a Dynamic Host Configuration Protocol (DHCP) request message; and wherein sending the IP address and the first subnet mask for use by the computing device further comprises sending a DHCP acknowledgement message that includes the IP address and the first subnet mask.

3. The method of claim 1 further comprising sending, by the first router to the second router, a message indicating that the computing device is joining the first LAN.

4. The method of claim 1 wherein obtaining, by the first router, the address of the second router further comprises:
   requesting, from a server computing device that is on a different network than the first LAN, configuration information associated with the first LAN, the configuration information including the address of the second router; and
   receiving, from the server computing device, the configuration information.

5. The method of claim 1 further comprising:
   receiving, by the first router from the computing device, an address resolution protocol (ARP) request message requesting a link layer address associated with an identified IP address;
   sending, by the first router to the second router via the secure communications channel, the ARP request message;
   receiving, by the first router from the second router via the secure communications channel, an ARP reply message that contains the link layer address of a computing device connected to the first LAN; and
   sending the ARP reply message to the computing device.

6. The method of claim 1 further comprising:
   prior to establishing the secure communications channel with the second router, connecting, by the first router, to a second LAN that has a second network address that is defined by a second subnet mask, the second network address being different from the first network address.

7. The method of claim 6 further comprising:
   prior to determining that the computing device seeks to join the first LAN, determining, by the first router, a Service Set Identifier (SSID) of the first LAN and a password associated with the first LAN;
   wirelessly broadcasting, by the first router, the SSID; and
   wherein determining that the computing device seeks to join the first LAN comprises receiving, by the first router from the computing device, a wireless request to join the SSID.

8. The method of claim 7 wherein determining, by the first router, the SSID of the first LAN and the password associated with the first LAN comprises requesting, from a server computing device that is on a different network than the first LAN, configuration information associated with the first LAN, the configuration information including the SSID of the first LAN and the password associated with the first LAN.

9. The method of claim 1 further comprising:
   requesting, by the first router from a server computing device that is on a different network than the first LAN, configuration information associated with the first LAN, the configuration information including firewall rules that prohibit accessing a particular web address;
   receiving, from the server computing device, the configuration information;
   receiving, by the first router from the computing device, a request to access the particular web address;
   accessing, by the first router, the firewall rules; and
   based on the firewall rules, rejecting the request.

10. The method of claim 1 wherein the first router is connected to a second network that is a different network from the first LAN.

11. The method of claim 1 further comprising:
receiving, by the first router from the computing device, a media access control (MAC) broadcast message; and
sending, by the first router to the second router, the MAC broadcast message.

12. The method of claim 1 wherein the first router communicates with the second router via an intermediate network that is different from the first LAN.

13. The method of claim 1 further comprising requesting, by the first router from a server computing device, LAN configuration information that identifies the second router and an IP address of the second router.

14. The method of claim 13 further comprising:
receiving, by the first router via user input, authentication information comprising a user identifier and a password;
authenticating, by the first router with the server computing device, a user using the user identifier and the password; and
subsequently requesting, by the first router from the server computing device, the LAN configuration information that identifies the second router and the IP address of the second router.

15. The method of claim 1 further comprising:
receiving, by the first router from the second router, a message indicating a new computing device has joined the first LAN, the message including a MAC address of the new computing device and an IP address of the new computing device; and
updating, by the first router, configuration information to include the MAC address of the new computing device and the IP address of the new computing device.

16. The method of claim 1 further comprising:
receiving, by the first router from the computing device, a first message destined for a destination computing device that is connected to the first LAN, the first message identifying a MAC address of the destination computing device; and
sending, by the first router to the second router via the secure communications channel, the first message.

17. The method of claim 16 further comprising:
receiving, by the first router from the computing device, a second message destined for the destination computing device, the second message identifying a MAC address of the first router and an IP address that is not on the first LAN;
sending, by the first router to a third router that is not on the first LAN, the second message for subsequent routing to the destination computing device.

18. A router comprising:
a memory; and
a processor device coupled to the memory to:
obtain an address of a second router that implements a first local area network (LAN);
cause the establishment of a secure communications channel with the second router by using the address of the second router;
determine that a computing device seeks to join the first LAN;
obtain an internet protocol (IP) address and a first subnet mask wherein the first subnet mask as applied to the IP address yields a same network address as a first network address of the first LAN; and
send, to the computing device, the IP address and a first subnet mask associated with the first LAN for use by the computing device.

19. The router of claim 18 wherein to obtain the address of the second router, the processor device is further to:
request, from a server computing device that is on a different network than the first LAN, configuration information associated with the first LAN, the configuration information including the address of the second router; and
receive, from the server computing device, the configuration information.

20. A non-transitory computer-readable storage medium that includes executable instructions configured to cause a processor device to:
obtain an address of a second router that implements a first local area network (LAN);
cause the establishment of a secure communications channel with the second router by using the address of the second router;
determine that a computing device seeks to join the first LAN;
obtain an internet protocol (IP) address and a first subnet mask wherein the first subnet mask as applied to the IP address yields a same network address as a first network address of the first LAN; and
send, to the computing device, the IP address and a first subnet mask associated with the first LAN for use by the computing device.

* * * * *